United States Patent [19]

Kinoshita et al.

[11] Patent Number: 4,900,059
[45] Date of Patent: Feb. 13, 1990

[54] TILTING AND TELESCOPE TRAVELING STEERING COLUMN ARRANGEMENT

[75] Inventors: Satoshi Kinoshita; Hiroyuki Kume, both of Kosai, Japan

[73] Assignees: Nissan Motor Co., Ltd., Yokohama; Fuji Kiko Co., Ltd., Tokyo, Japan

[21] Appl. No.: 261,874

[22] Filed: Oct. 25, 1988

[30] Foreign Application Priority Data

| Oct. 26, 1987 | [JP] | Japan | 62-270020 |
| Oct. 26, 1987 | [JP] | Japan | 62-163481[U] |
| Mar. 23, 1988 | [JP] | Japan | 63-37894[U] |
| Mar. 23, 1988 | [JP] | Japan | 63-37895[U] |
| Jun. 29, 1988 | [JP] | Japan | 63-86550[U] |

[51] Int. Cl.$^4$ .............................................. B62D 1/18
[52] U.S. Cl. .................................... 280/775; 74/493; 74/424.8 NA; 74/409; 74/459
[58] Field of Search ....... 280/775; 74/493, 424.8 NA, 74/409, 459

[56] References Cited

U.S. PATENT DOCUMENTS

| 2,380,662 | 7/1945 | Means, Jr. ........................ 74/459 |
| 2,768,532 | 10/1956 | Russell ........................ 74/424.8 NA |
| 3,252,350 | 5/1966 | Zeigler ............................. 74/493 |
| 3,396,600 | 8/1968 | Zeigler et al. ..................... 74/493 |
| 4,503,504 | 3/1985 | Suzumura et al. ................ 364/425 |
| 4,602,520 | 7/1986 | Nishikawa et al. ................ 74/493 |
| 4,691,587 | 9/1987 | Farrand ............................. 74/493 |

FOREIGN PATENT DOCUMENTS

| 3229481 | 3/1983 | Fed. Rep. of Germany . |
| 3423161 | 1/1985 | Fed. Rep. of Germany . |
| 60-4464 | 1/1985 | Japan . |
| 60-18449 | 1/1985 | Japan . |

Primary Examiner—Charles A. Marmor
Assistant Examiner—Karin Tyson
Attorney, Agent, or Firm—Foley & Lardner, Schwartz, Jeffery, Schwaab, Mack, Blumenthal & Evans

[57] ABSTRACT

A tilting and telescope traveling steering column arrangement for an automotive vehicle. The telescope traveling mechanism of the steering column arrangement includes a pluarlity of balls which are rotatably fixed on the peripheral surface of a ring member which is fixedly mounted on a steering shaft provided with a steering wheel. The balls are positioned along an imaginary helical line on the peripheral surface of the ring member. The ring member with the balls are fitted in a sleeve formed at its inner peripheral surface with a helical groove, in such a manner that the balls are movably fitted in the helical groove. The sleeve is axially fixed to a movable bracket. The ring member is driven through a gear mechanism by an electric motor, thus axially displacing the steering shaft relative to the sleeve. The tilt mechanism of the steering column arrangement includes a tilt screw movably connecting the movable bracket and a fixed bracket fixed to a vehicle body. The tilt screw is threaded inserted in a nut structure rotatably fixed relative to the fixed bracket. The nut structure is driven through a gear mechanism by an electric motor, thereby axially displacing the tilt screw and push up the movable bracket. The nut structure is formed with a threaded hole in which a seat member is fitted in such a manner as to be brought into press contact with the peripheral surface of the tilt screw, thereby to omit a play between the tilt screw and the nut structure.

27 Claims, 13 Drawing Sheets

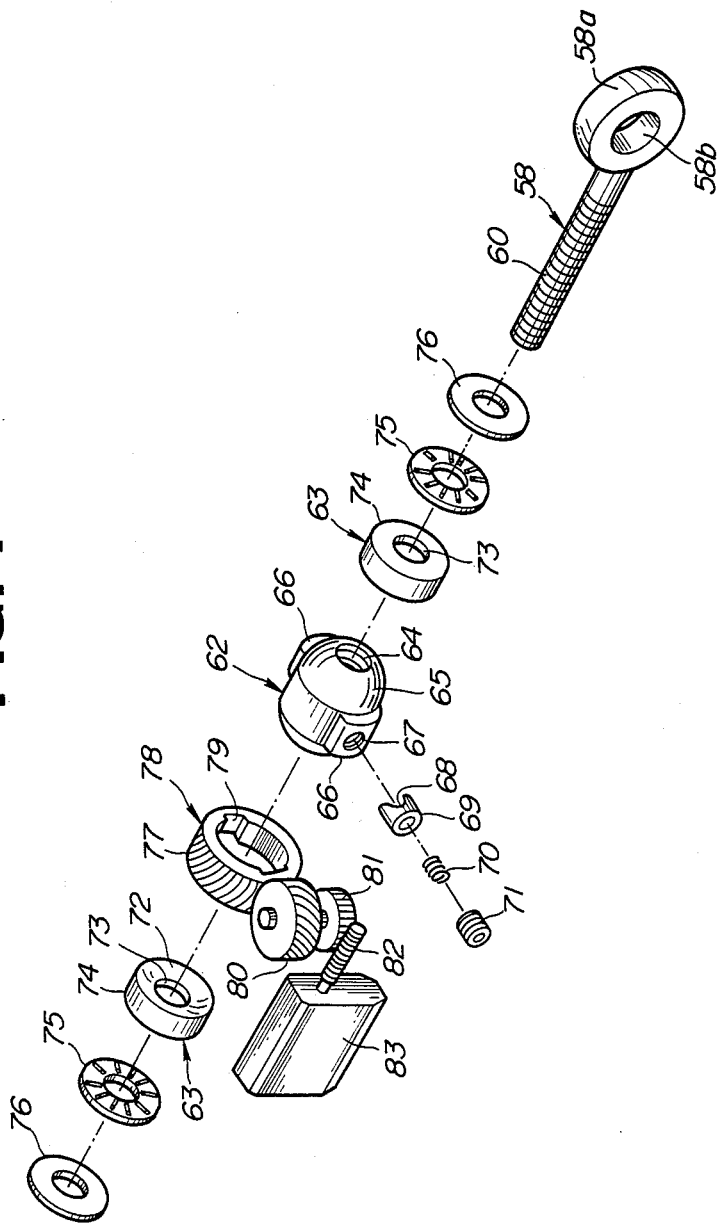

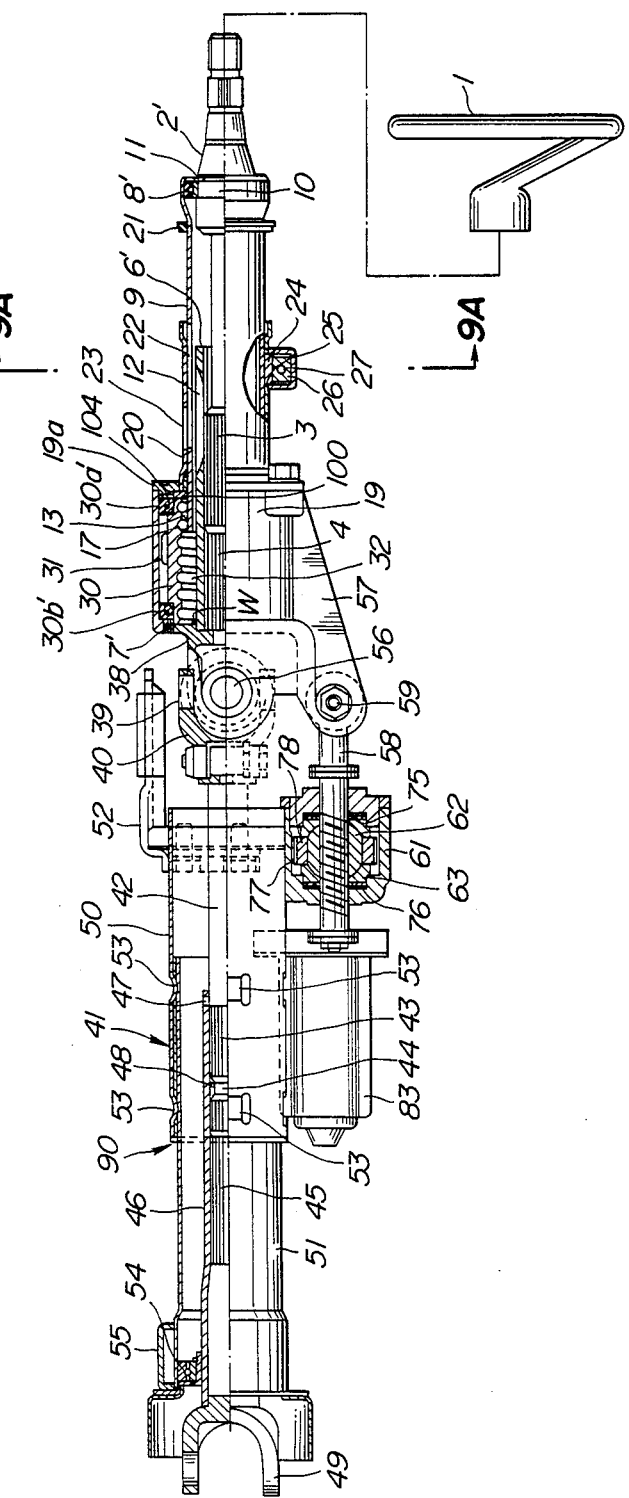

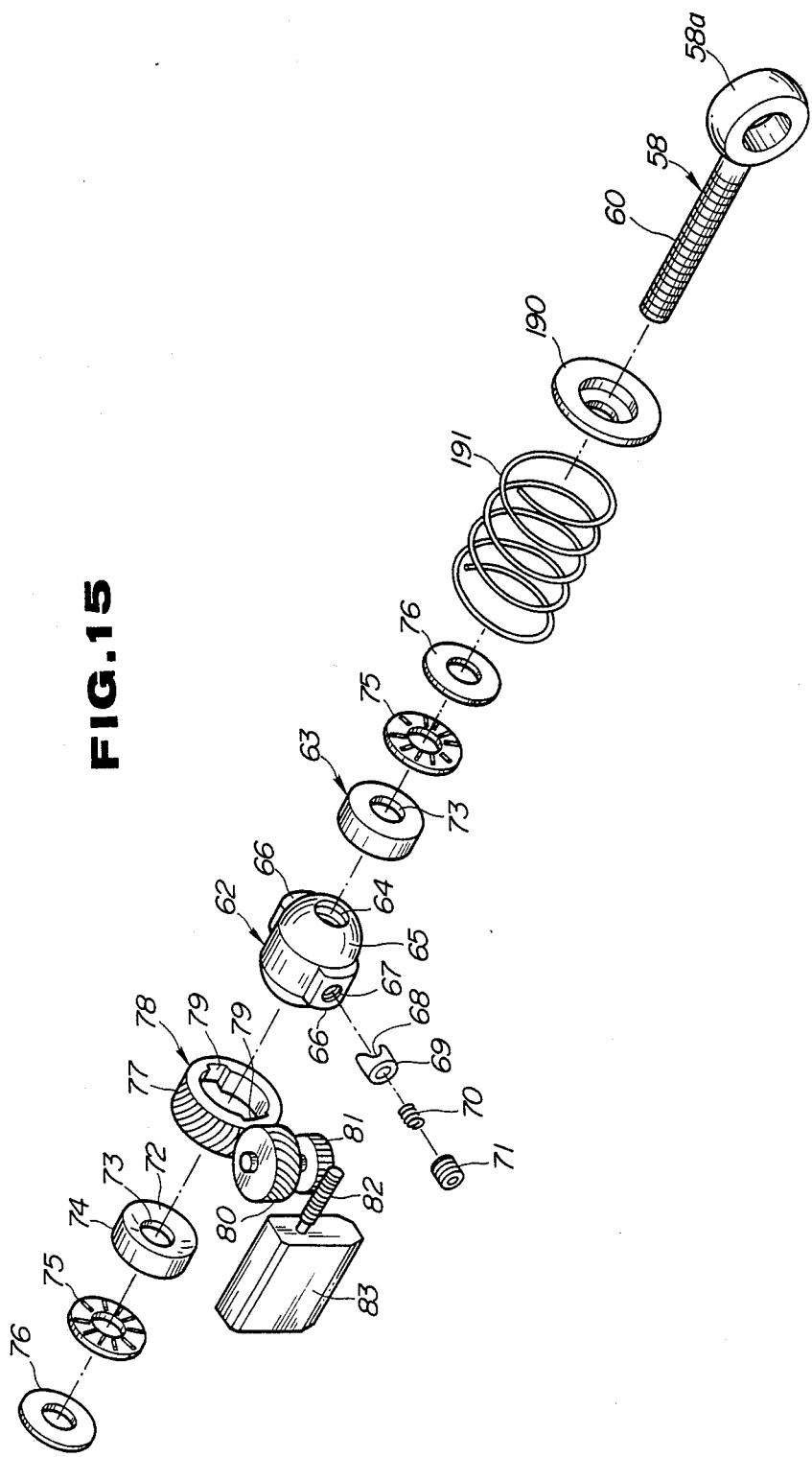

TILTING AND TELESCOPE TRAVELING STEERING COLUMN ARRANGEMENT

BACKGROUND OF THE INVENTION

1. Field of the Invention

This invention relates to a tilting and telescope traveling steering column arrangement for use in a motor vehicle such as an automotive vehicle, and more particularly to improvements in telescope traveling and tilt mechanisms of the steering column arrangement.

2. Description of the Prior Art

A variety of tilting and telescope traveling steering column arrangements have been proposed and put into practical use in the field of automotive vehicles. In such a tilting and telescope traveling steering column arrangement, the telescope traveling mechanism is usually arranged as follows: A part of a steering shaft on which a steering wheel is mounted is axially slidably fitted in a fixed tube fastened to a movable bracket, in which the splines of the part of the steering shaft are in engagement with the splines of the fixed tube. This allows the steering shaft to axially move relative to the fixed tube. The steering shaft is coaxially fitted with a telescopic upper jacket which is coaxially fitted in a telescopic lower jacket fixed to the movable bracket. The telescopic upper jacket is formed with a threaded portion which is engaged with a threaded portion of a telescopic sleeve. The telescopic sleeve is rotated around its axis by an electric motor, thus axially displacing the steering shaft. The above-discussed telescope traveling mechanism is disclosed, for example, in Japanese Patent Provisional Publication Nos. 60-4464 and 60-18449.

However, extension and contraction motions of the steering shaft are accomplished under engagement of external and internal threads, in which the external and internal threads displace axially relatives to each other upon rotation. Since such engagement of the external and internal threads are considerably high in frictional resistance, a relatively large force is required to axially displace the steering shaft. Accordingly, the electric motor is required to have a high output capacity and therefore becomes high in cost. As a result, an electrically operated telescope traveling mechanism can be used only in high grade automotive vehicles. Additionally, such a high output capacity electric motor is usually large-sized, and therefore a larger passenger compartment space is required to avoid contact of the passenger's knee with the electric motor in case the electric motor is installed the steering column arrangement. This provides inconvenience in design of automotive vehicle.

The tilt mechanism of the tilting and telescope traveling mechanism is usually arranged as follows: The steering shaft on which the steering wheel is mounted is fixed to the movable bracket which is rotatably supported through a tilt hinge to the fixed bracket. Accordingly, the steering wheel can set at a desired height position by rotating the movable bracket relative to the fixed bracket. More specifically, a tilt screw is provided between the movable and fixed brackets. A nut which is axially fixed to the fixed bracket is engagingly mounted on the tilt screw and axially rotatable by an electric motor to axially displace the tilt screw so as to push up the movable bracket. This causes the steering shaft to tilt upwardly.

However, axial displacement of the tilt screw relative to the nut is accomplished under engagement of external and internal threads, and therefore a clearance is unavoidably formed between the external and internal threads. This clearance unavoidably produces a so-called play between the movable and fixed brackets, thereby rendering the steering wheel unstable. Accordingly, the steering column arrangement produces vibration and vibration noise particularly during high speed cruising, thus disturbing comfortable driving.

SUMMARY OF THE INVENTION

It is an object of the present invention to provide an improved tilting and telescope traveling steering column arrangement including a telescope traveling mechanism which can be operated by a small-sized and low output capacity electric motor, lowering production cost of the steering column arrangement while avoiding inconvenience in vehicle design.

Another object of the present invention is to provide an improved tilting and telescope traveling steering column arrangement including a tilt mechanism which does not produce play, thereby preventing vibration of a steering wheel and vibration noise thereby.

An aspect of the present invention resides in a steering column arrangement comprising a telescope traveling mechanism. The telescope traveling mechanism includes a steering shaft on which a steering wheel is fixedly mounted. The steering shaft is axially movable relative to a stationary member which is movable relative to a vehicle body of a vehicle. A plurality of balls are movably fixed on the outer peripheral surface of the steering shaft and positioned along an imaginary line on the steering shaft peripheral surface. Each ball is rotatable but not displaceable. A sleeve is disposed around the steering shaft and formed at its inner peripheral surface with a helical groove in which the balls are fitted. The sleeve is rotatable around its axis and axially fixed to the side of the stationary member. An annular gear is coaxially formed on the outer peripheral surface of the sleeve. A drive gear is provided in mesh with the annular gear and operated by an electric motor.

By virtue of engagement through the rotatable balls between the steering shaft and the sleeve during extension and contraction motions of the telescopic steering shaft, friction between the steering shaft and the sleeve is sharply lowered. Accordingly, it is sufficient that the electric motor is small in output capacity as compared with conventional arrangements. Thus an electric motor of small-size can be used, thereby lowering the production cost of the steering column arrangement while providing an ample space for installation of steering column to improve freedom in vehicle design.

Another aspect of the present invention resides in a steering column arrangement comprising a tilt mechanism. The tilt mechanism includes a tilt hinge mechanism through which a stationary member is rotatably supported to a fixed member. A steering shaft on which a steering wheel is fixedly mounted is connected to the stationary member which is movable relative to a vehicle body of a vehicle. The fixed member is fixed relative to the vehicle body. A tilt screw is provided to connect the stationary member and the fixed member. The axial displacement of the tilt screw relative to the fixed member causes the stationary member to tilt. A nut structure is engagingly mounted on the tilt screw and axially fixed relative to the fixed member. The nut structure is rotatable around its axis under drive of an electric motor. The rotation of the nut structure causes the tilt screw to make its axial displacement. The nut structure is formed with a hole contiguous with the axial threaded opening of the nut structure. The tilt screw is disposed in the axial threaded opening. Additionally, a seat member is disposed in the hole and formed with a curved surface. The seat member is biased in the direction of the tilt screw so that the seat member curved surface is brought into press contact with the peripheral surface of the tilt screw.

Accordingly, since the seat member is kept in slidable and press contact with the tilt screw, the tilt screw is always biased to one side of the axial threaded opening of the nut structure, thereby substantially omitting a clearance in connection with the threaded engagement between the tilt screw and the nut structure. This prevents a so-called play from being produced between the tilt screw and the nut structure, thus maintaining stability of the steering wheel and therefore making possible comfortable and safe vehicle driving

BRIEF DESCRIPTION OF THE DRAWINGS

In the drawings, like reference numerals designate corresponding elements and parts throughout all figures, in which:

FIG. 4 is a perspective exploded view of an essential part of a tilt mechanism of the steering column arrangement of FIG. 1;

FIG. 6 is a side elevation, partly in section, of a second embodiment of the steering column arrangement in accordance with the present invention;

FIG. 15 is a perspective exploded view of an essential part of the tilt mechanism of the steering column arrangement of FIG. 14.

DETAILED DESCRIPTION OF THE INVENTION

Figure 1:
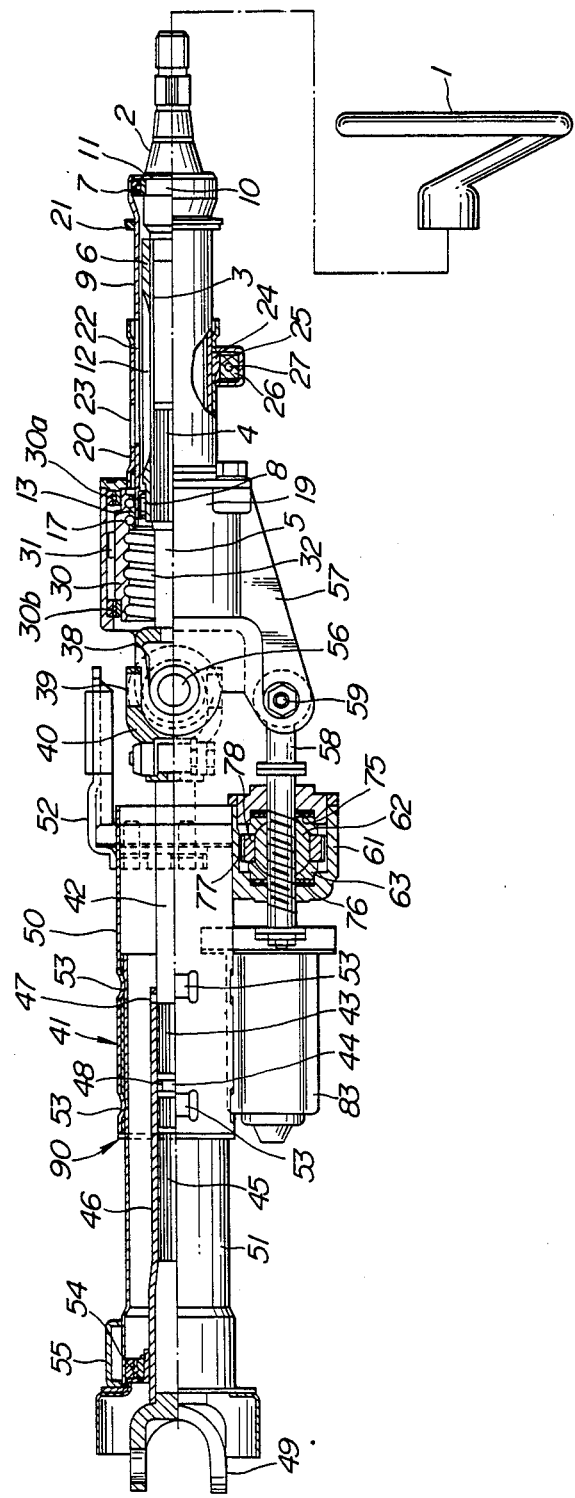
FIG. 1 is a side elevation, partly in section, of a first embodiment of a tilting and telescope traveling steering column arrangement in accordance with the present invention.

Referring now to FIGS. 1 to 5, there is shown a first embodiment of a tilting and telescope traveling steering column arrangement in accordance with the present invention, for an automotive vehicle. The steering column arrangement comprises a shaft tube 6 having a first end section to which an upper shaft 2 is fixedly secured, and a second end section formed at its inner peripheral surface with splines 3. The first end section of a lower shaft 5 formed at its outer peripheral surface with splines 4 is inserted to the second end section of the shaft tube 6 in such a manner that the splines 4 are in engagement with the splines 3 of the shaft tube 6. A steering wheel 1 is fixedly mounted on the upper shaft 2. The shaft tube 6 is rotatably supported through bearings 7, 8 on the inner peripheral surface of a telescopic tube 9 in a manner to be rotatable around the axis thereof. The telescopic tube 9 forms part of a telescope traveling mechanism of the steering column arrangement. The bearing 7, 8 are positioned at the opposite end sections of the telescopic tube 9 and between the shaft tube 6 and a united body of the telescopic tube 9 and the upper shaft 2. The bearing 7 is positioned at one end section of the upper shaft 2 and mounted on the step portion 10 of the upper shaft 2. The bearing 7 is secured in position by means of a washer 11 fixed to the upper shaft 2. The first end section of the telescopic tube 9 is disposed to cover the bearing 7 and bent radially inwardly at its end edge portion to be secured to the bearing 7. The bearing 8 is positioned at the second end section of the shaft tube 6. The shaft tube 6 is formed with an axially extending keylock groove 12.

Figure 2:
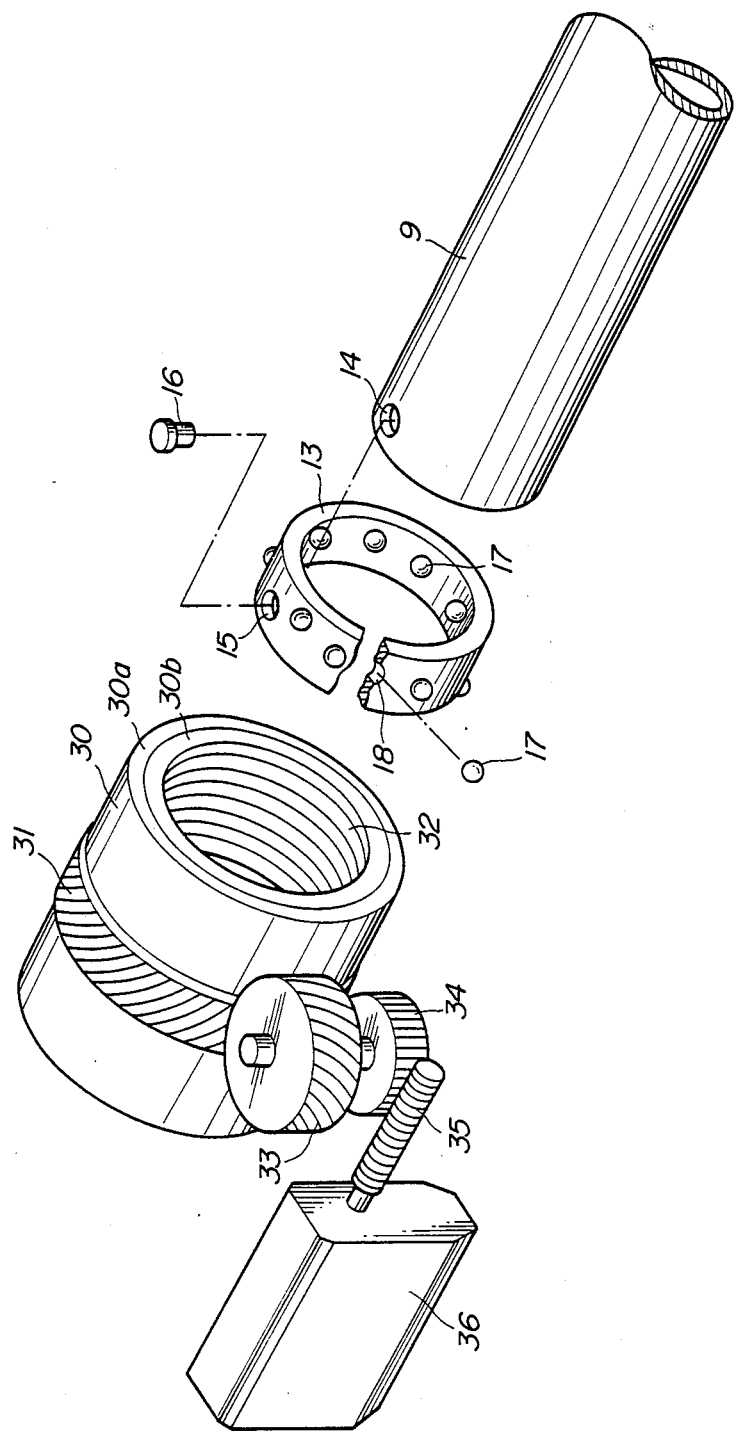
FIG. 2 is a perspective exploded view of an essential part of a telescope traveling mechanism of the steering column arrangement of FIG. 1.

A ring or cylindrical member 13 is fixedly fitted on the outer peripheral surface of the telescopic tube 9 at the second end section, so that the ring member 13 is coaxial with the telescopic tube 9. As shown in FIG. 2, the fixed connection between the ring member 13 and the telescopic tube 9 is accomplished by means of a pin or screw 16 inserted in a hole 14 formed in the telescopic tube 9 and a hole 15 formed in the ring member 13, the holes 14 and 15 being in agreement with each other. The ring member 13 is formed with a plurality of holes 18 which are arranged along an imaginary helical line on the outer peripheral surface of the ring member 13 and are positioned at intervals of a predetermined distance. A spherical ball 17 is rotatably fitted in each hole 18.

Turning to FIG. 1, the telescopic tube 9 is coaxially inserted in a guide tube 20 so as to be axially movable relative to the guide tube 20 and so as not to be rotatable around its axis under the action of an axially extending hole and a pin inserted in the hole (not shown). The guide tube 20 is fixedly secured to a movable bracket 19. The telescopic tube 9 is provided at its first end section with a stopper 21 and formed with an axially extending elongate hole 22 aligned with the keylock groove 12. In this connection, the guide tube 20 is formed with a key hole 23 aligned with the elongate hole 22 and the keylock groove 12.

Figure 3:
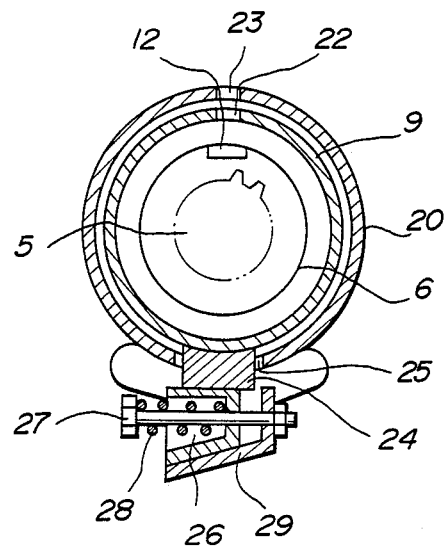
FIG. 3 is a cross-sectional view of the steering column arrangement of FIG. 1, showing a contact member.

As shown in FIG. 3, the guide tube 20 is formed with a window hole 25 in which a contact member 24 is movably fitted. The contact member 24 is in press contact with the outer peripheral surface of the telescopic tube 9. A wedge member 26 is provided to cause the contact member 24 to be brought into press contact with the outer peripheral surface of the telescopic tube 9. The wedge member 26 is biased by a spring 28 which is disposed between the bolt head of a bolt 27 and the wedge member 26. The bolt 27 passes through the wedge member 26 and is secured to a bracket fixed relative to the guide tube 20.

As shown in FIG. 1, inside the movable bracket 19, a cylindrical sleeve 30 is supported through bearings 30a, 30b and is rotatable around the axis thereof. The cylindrical sleeve 30 has at its outer peripheral surface an annular helical gear teeth section 31 which is coaxial with the cylindrical sleeve 30, and at its inner peripheral surface with a helical groove 32 having a generally semicircular cross-section. The balls 17 rotatably supported in the ring member 13 are rotatably fitted in the helical groove 32. It is preferable that the sleeve 30 includes an outer sleeve section 30a, and an inner sleeve section 30b fitted inside the outer sleeve section 30a. The inner sleeve section 30b is made of plastic or the like and formed on its inner peripheral surface with the helical groove 32. The helical gear teeth section 31 is in mesh with a helical gear 33 whose axis is perpendicular to the axis of the helical gear teeth section 31. A worm wheel 4 is coaxially connected to the helical gear 33 in such a manner that the helical gear 33 and the worm wheel 34 are fixedly mounted on a common shaft. The worm wheel 34 is in mesh with a worm 35 formed at one end section of an output shaft of an electric motor 36. The electric motor 36 is electrically connected through a switch (not shown) to an electric source for the automotive vehicle.

As seen from FIG. 1, a yoke 38 is fixed to the second end section of the lower shaft 5. A yoke 40 is connected to the lower shaft 5 through the yoke 38 and a trunnion 39 thereby to constitute a universal joint. The yoke 40 is connected to the first end section of a steering upper shaft 42 inserted in a column tube 41. The second end section of the steering upper shaft 42 is formed at its outer peripheral surface with axially extending serrations 43. An annular groove 44 is peripherally formed to cross the serrations 43. A steering lower tube 46 is fitted at its first end section on the second end section of the steering upper shaft 42, in which the steering lower tube 46 is formed at its inner peripheral surface with axially extending serrations 45 which are in engagement with the serrations 43. The first end section of the steering lower tube 46 is formed with a through-hole 47 through which a steel ball 48 is supplied into the groove 44, which steel ball is in press contact with the serrations 45 of the steering lower tube 46. A yoke 49 is fixedly connected to the second end section of the steering lower tube 46 and further connected to another yoke (not shown) thereby to constitute a universal joint. Accordingly, the steering lower tube 46 is connected through the universal joint and an intermediate shaft (not shown) to a steering gear box (not shown).

The column tube 41 is made up of an upper column tube 50 and a lower column tube 51. The upper column tube 50 is connected at the first end section to a fixed bracket 52 fixed to a vehicle body, and is formed at the second end section with embossed portions 53 which project inwardly and are in press contact with the outer peripheral surface of the lower column tube 51. The lower column tube 51 is axially fitted at its first end section in the upper column tube 50 and rotatably supports the steering lower tube 46 through a bearing 54 positioned at the second end section thereof. The second end section of the lower column tube 51 is provided with a clamp 55 through which the lower column tube 51 is fixed to the vehicle body.

Figure 5:
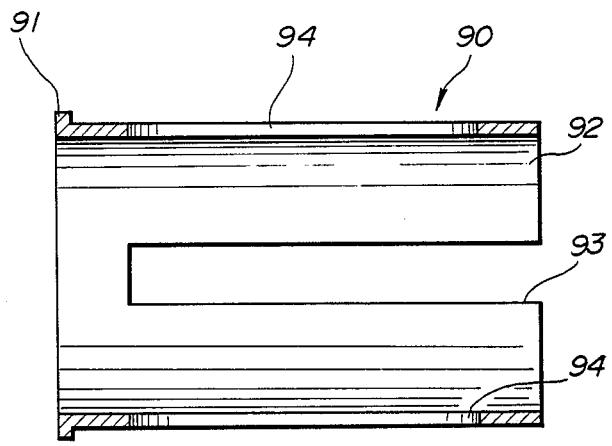
FIG. 5 is a longitudinal sectional view of a spacer disposed between upper and lower column tubes of the steering column arrangement of FIG. 1.

A spacer 90 is provided between the upper and lower column tubes 50, 51 to increase the rigidity of the fitting section of the upper and lower column tubes 50, 51, i.e., a section at which the embossed portions spaced a predetermined distance contact with the lower column tube 51. As shown in FIG. 5, this spacer 90 is generally cylindrical and includes a cylindrical part 91 formed with axially extending elongate cutouts 93 and axially extending elongate holes 94. Each cutout 93 opens at the end edge of the first end section of the cylindrical part 92. A radially outwardly extending flange part 91 is formed in the cylindrical part 91 at the end edge of the second end section. The elongate cutouts 93 and holes 94 are located at intervals of a predetermined distance in the peripheral direction of the cylindrical part 91. The embossed portions 53 which are axially arranged with a predetermined space are fitted in the elongate cutouts and holes 94. The elongate cutouts 93 serve as guides while the elongate holes 94 serve as means for preventing the lower column tube 51 from coming off together with the flange part 91 when the spacer 90 is inserted into the upper column tube 50.

The movable bracket 19 which is rotatable by means of a tilt hinge 56 is provided with arms 57 each having an end rotatably connected to a tilt screw 58 by a bolt 59. The tilt screw 58 forms part of a tilt mechanism for the rotatable bracket 19 as shown in detail in FIG. 4. The tilt screw 58 is formed at its first end section with an annular section 58a (defining a hole 58b) mounted on the bolt 59. The second end section of the tilt screw 58 is formed with a threaded portion 60. The tilt screw 58 passes through a housing 61, a generally spherical member 62 or nut structure, and a seat arrangement 63. The spherical member 62 and the seat arrangement 63 are disposed within the housing 61. The housing 61 is fixed to the lower surface of the fixed bracket 52. The spherical member 62 is formed with a threaded hole 64 into which the threaded portion 60 of the tilt screw 58 is inserted to make a threaded engagement. The spherical member 62 is formed with oppositely located hemispherical portions 65, 65 through which the opposite ends of the threaded hole 64 open, respectively. The spherical member 62 is further formed with a pair of outwardly extending projections 66, 66 which are located opposite to the axis of the threaded hole 64. One of the projections 66, 66 is formed with a threaded hole 67 whose axis is perpendicular to the axis of the threaded hole 64. A seat member 69 is axially movably disposed within the threaded hole 67 to be brought into press contact with the tilt screw 58. The seat member 69 is formed with a curved contacting surface 68 which is brought into tight contact with the surface of the tilt screw 58. A small coil spring 70 is disposed within the threaded hole 67 to bias the seat member 69 against the tilt screw 58. Additionally, a set screw 71 is screwed in the threaded hole 67 to set the position of the small coil spring 70.

The seat arrangement 63 for the spherical member 62 includes a pair of ball seats 74, 74 each having a hemispherical depression surface 72. The ball seat 74 is formed with a through-hole 73 through which the tilt screw 58 passes, the through-hole 73 being formed at the center of the hemispherical depression surface 72. The ball seats 74, 74 are so disposed that the spherical member 62 is interposed between them and in such a manner that the hemispherical depression surface 72 of each ball seat 74 is in tight contact with each hemispherical portion 65 of the spherical member 62. A pair of thrust needle bearings 75, 75 are disposed axially outside of and in contact with the ball seats 74, 74, respectively. Additionally, a pair of thrust washers 76, 76 are disposed axially outside of and in contact with the thrust needle bearings 75, 75, respectively. Thus, the spherical member 62 with the ball seats 74, 74 is secured within the housing 61 under the action of thrust needle bearings 75, 75 and the thrust washers 76, 76 which are also disposed within the housing 61. In this state, the tilt screw 58 passes through the spherical member 62, the ball seats 74, the thrust needle bearings 75 and the thrust washers 76. A helical ring gear 78 is fixedly secured on the spherical member 62 in such a manner that the projections 66, 66 of the spherical member 62 engage with grooves 79, 79 of the ring gear 78. The grooves 79, 79 are positioned opposite to each other with respect to the axis of the ring gear 78. The ring gear 78 is formed at its outer peripheral surface with helical teeth 77 and disposed within the housing 61. A helical gear 80 in mesh with the teeth 77 of the ring gear 78 is rotatably supported by the housing 61. The gear 80 is axially provided with a worm gear 81 which is in mesh with a worm 82 formed in an output shaft of an electric motor 83 fixed to the lower surface of the upper column tube 50. The electric motor 83 is electrically connected through a switch (not shown) to the electric source for the automotive vehicle.

The manner of operation of the thus arranged steering column arrangement will be discussed hereinafter.

In order to accomplish telescopic adjustment of the steering column arrangement, the electric motor 36 is first switched ON so that the output shaft 37 is rotated and therefore the worm 35 is rotated. Then, the helical gear 33 is rotated through the worm gear 34 thereby to rotate the gear section 31, and accordingly the sleeve 30 is rotated around its axis. Since the sleeve 30 is supported through the bearings 30a, 30a on the inner surface of the movable bracket 19, the sleeve 30 cannot move axially and therefore rotation of the sleeve 30 causes the helical groove 32 to rotate thereby to guide and move the balls 17 along the helical groove 32. As a result, the ring member 13 moves axially of the sleeve 30, so that the telescopic tube 9 fixed to the ring member 13 moves axially of the sleeve 30, thereby axially moving the upper shaft 2 fixed to the telescopic tube 9 and the shaft tube 8 fixed to the upper shaft 2. The shaft tube 6 can slidably axially moved relative to the lower shaft 5 under the engagement of the splines 3, 4. It will be understood that rotation of the upper shaft 2 can be transmitted to the lower shaft 5 under the engagement of the splines 3, 4 of the shaft tube 6 and the lower shaft 5. When the telescopic tube 9 extends from or withdraws into the guide tube 20, the contacting member 24 is always in slidable contact with the outer peripheral surface of the telescopic tube 9, in which the contacting member 24 forces the telescopic tube 20 against the guide tube 20, thereby omitting a play therebetween.

In order to accomplish tilt adjustment of the above-arranged steering column arrangement, the electric motor 83 is first driven by operating the switch. Accordingly the worm 82 is rotated through the output shaft of the electric motor 83, thereby causing the worm gear 81 and the gear 80 to rotate. This rotates the ring gear 78 and therefore the spherical member 62. Thus the tilt screw 58 axially moves under engagement of the threaded portion 64 of the spherical member 62 and the threaded portion 60 of the tilt screw 58. Then, the movable bracket 19 rotates around the tilt hinge 56 through the arms 57. Although the tilt screw 58 inclines vertically relative to the spherical member 62 under rotatable movement of the movable bracket 19, such inclination can be absorbed by the spherical member 62 and the ball seats 74. During axial movement of the tilt screw 58, the curved contacting surface 68 of the seat member 69 is always in slidable contact with the threaded portion 60 of the tilt screw 58 thereby to bias the tilt screw 58 against one side surface of the threaded hole 64. This substantially removes a clearance between the threaded portion 60 of the tilt screw 58 and the inside surface of the threaded hole 64 of the spherical member 62. When the movable bracket 19 rotates a desired angle, the electric motor 83 stops to fix the steering wheel 1 in a desired position.

FIGS. 6 to 9A illustrate a second embodiment of the steering column arrangement according to the present invention, which is similar to the first embodiment of FIGS. 1 to 5. In this embodiment, the shaft tube 6' is fixedly secured to the yoke 38 by means of welding to form a welded section W. The yoke 38 is rotatably supported through a bearing 7' on the movable bracket 19. The upper shaft 2' extends into the shaft tube 6' and is formed at its outer peripheral surface with the splines 3. The splines 3 are in axially slidable engagement with the splines 4 formed at its inner peripheral surface of the shaft tube 6'. Thus the upper shaft 2' is axially movable relative to the fixed shaft tube 6'.

Figure 7:
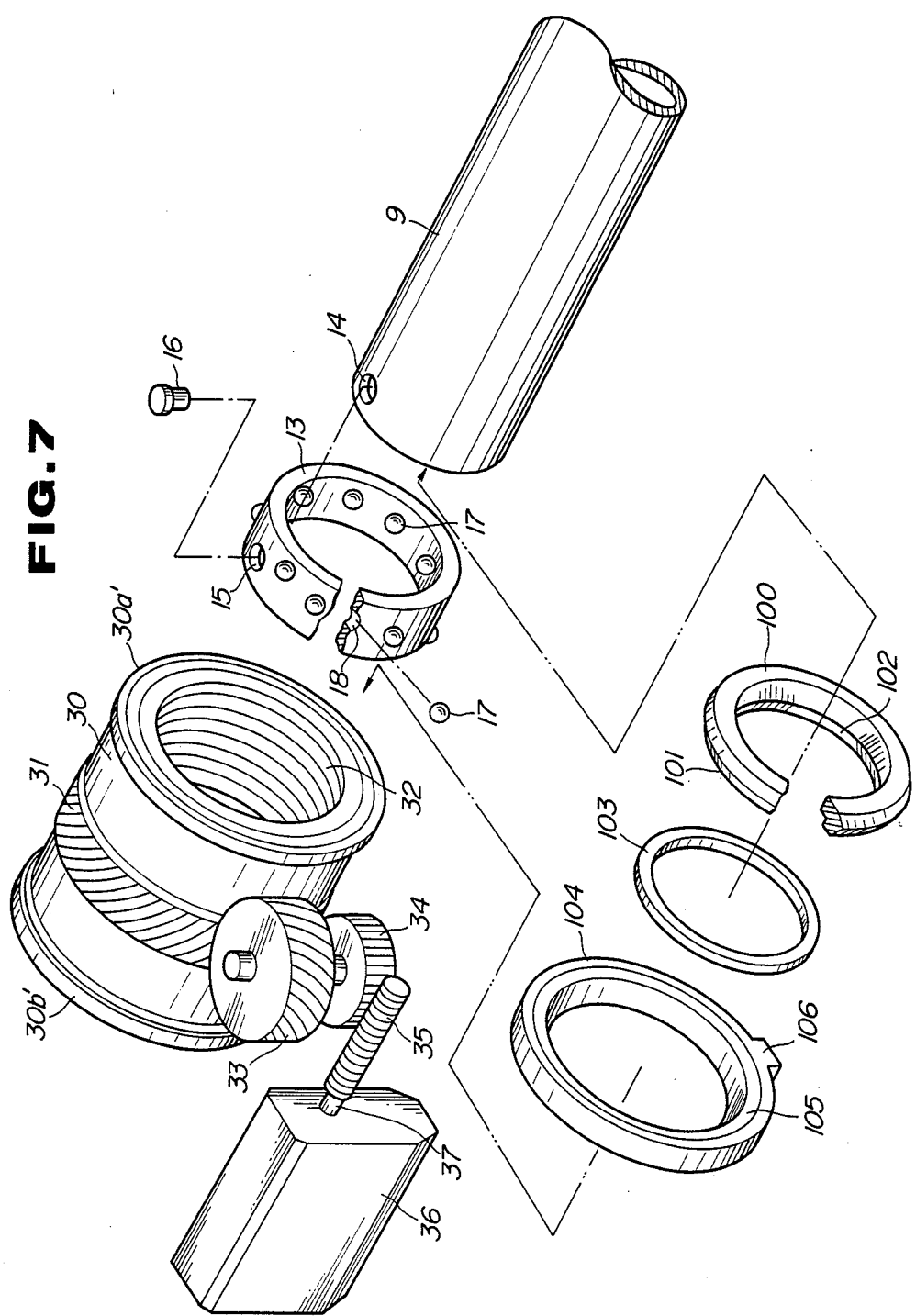
FIG. 7 is a perspective exploded view of an essential part of the telescope traveling mechanism of the steering column arrangement of FIG. 6.

As best shown in FIG. 7, an inner ring 100 is coaxially and fittingly mounted on the telescopic tube 9 in such a manner that the telescopic tube 9 is slidably movable to the inner ring 100. The inner ring 100 is formed along its outer periphery with a tapered or frustoconical inclined outer peripheral surface 101. Additionally, the inner ring 100 is formed with an annular cutout or step portion 102 to which a damping ring 103 is fitted so that the telescopic tube 9 is slidably and tightly fitted with the inner periphery of the damping ring 103. The damping ring 103 is formed of elastomeric material such as polyurethane resin or synthetic rubber.

Figure 8:
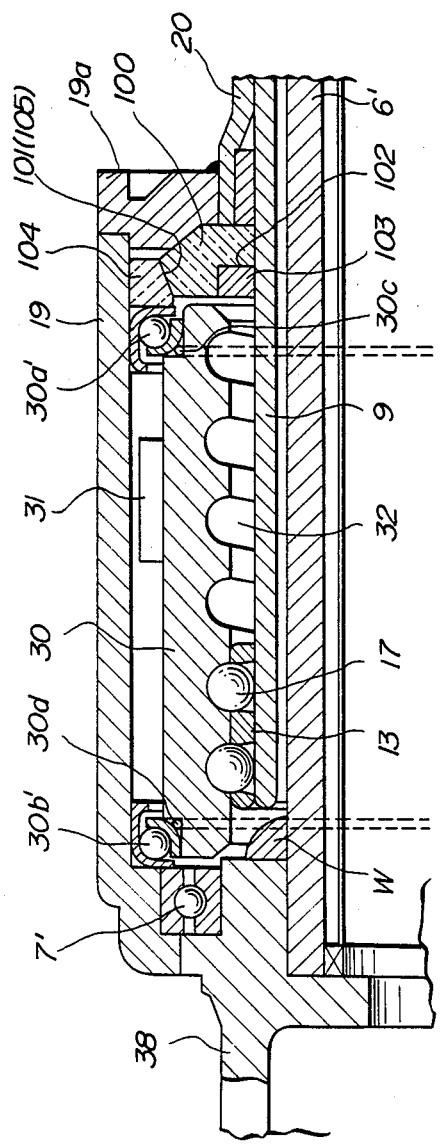
FIG. 8 is a fragmentary enlarged sectional view of an essential part of the telescope traveling mechanism of the steering column arrangement of FIG. 6.
Figure 9:
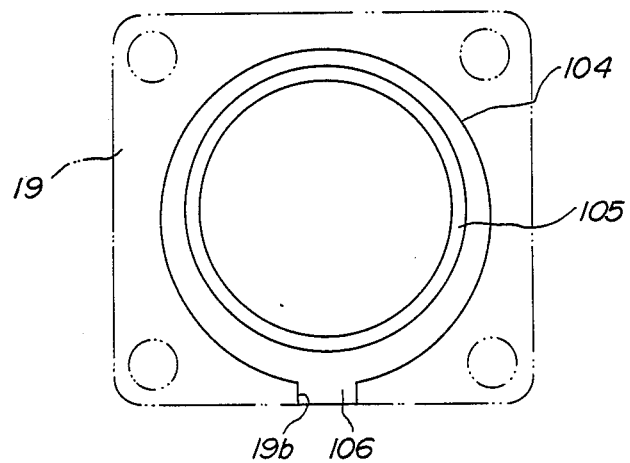
FIG. 9 is a front view of an outer ring used in the part of FIG. 8.
Figure 9A:
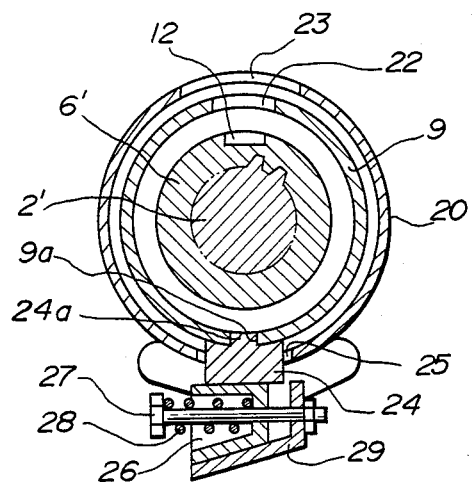
FIG. 9A is a cross-sectional view taken in the direction of arrows substantially along the line 9A—9A of FIG. 6.

In this embodiment, the sleeve 30 is provided at its opposite end sections with angular ball bearings 30a', 30b' through which the sleeve 30 is rotatably supported on the inner surface of the movable bracket 19. As shown in FIG. 8, the angular ball bearings 30a', 30b' are respectively in contact with elastomeric rings 30c, 30d which are fitted respectively in cutout or step portions formed at the opposite end sections of the sleeve 30, so that the angular ball bearings 30a', 30b' are biased outward of the end sections of the sleeve 30. An outer ring 104 is in contact with the angular ball bearing 30a' and fixed within the movable bracket 19. As shown in FIG. 7, the outer ring 104 is formed long its inner periphery with an annular tapered or frustoconical inner peripheral surface 105, and at its outer periphery with a radially outwardly extending projection 106. It is preferable that the annular tapered surface 105 is formed eccentric as shown in FIG. 9. The projection 106 be brought into engagement with a groove 19b formed on the lower surface of the movable bracket 19. As shown in FIG. 8, the inner ring 100 is brought into contact with the outer ring 104 and biased inwardly of the movable bracket 19 by a cap 19a of the movable bracket 19 so that the tapered outer peripheral surface 101 of the inner ring 100 and the tapered inner peripheral surface 105 of the outer ring 104 are in slidable contact with each other. As shown in FIG. 9A, in this embodiment, the contact member 24 is provided with a projection 24a which is fitted in an axially extending elongate hole 9a formed in the telescopic tube 9, so that the telescopic tube 9 is axially displaceable, but not rotatable, around its axis.

With this arrangement, the inner ring 100 is biased toward the outer ring 104 by the cap 19a while the outer ring 104 is biased outwardly by the angular ball bearing 30a' under bias of the elastomeric rings 30c, 30d, so that the tapered inner peripheral surface 105 of the outer ring 104 is in slidable contact with the tapered outer peripheral surface 101 of the inner ring 100. Accordingly, the sleeve 30 is biased toward the opposite side of the inner and outer rings 100, 104 and rotatably fixed. The telescopic tube 9 is slidably supported through the inner and outer rings 100, 104 to the movable bracket 19, and therefore the telescopic tube 9 is tightly supported to the movable bracket 19, even if there is a play between the guide tube 20 and the telescopic tube 9, thus preventing the telescopic tube 9 from vibration. Additionally, the telescopic tube 9 is maintained coaxial with the guide tube 20. Otherwise, the telescopic tube 9 is biased upward by the eccentric tapered inner peripheral surface 105 of the outer ring 104, thereby being effectively maintained coaxial with the guide tube 20.

Thus, since the telescopic tube 9 tightly engages through the inner and outer ring members 100, 104 with the inner surface of the movable bracket 19, no play is produced therebetween, thereby improving the support rigidity of the telescope traveling mechanism, while preventing uncomfortable vibration of the steering wheel.

It will be understood that the angular ball bearings 30a', 30b' may be replaced with usual ball bearings. The elastomeric rings 30c, 30d may be omitted, in which case an elastomeric washer is disposed between the ball bearing on the side of the cap 19a and the outer ring 104.

Figure 10:
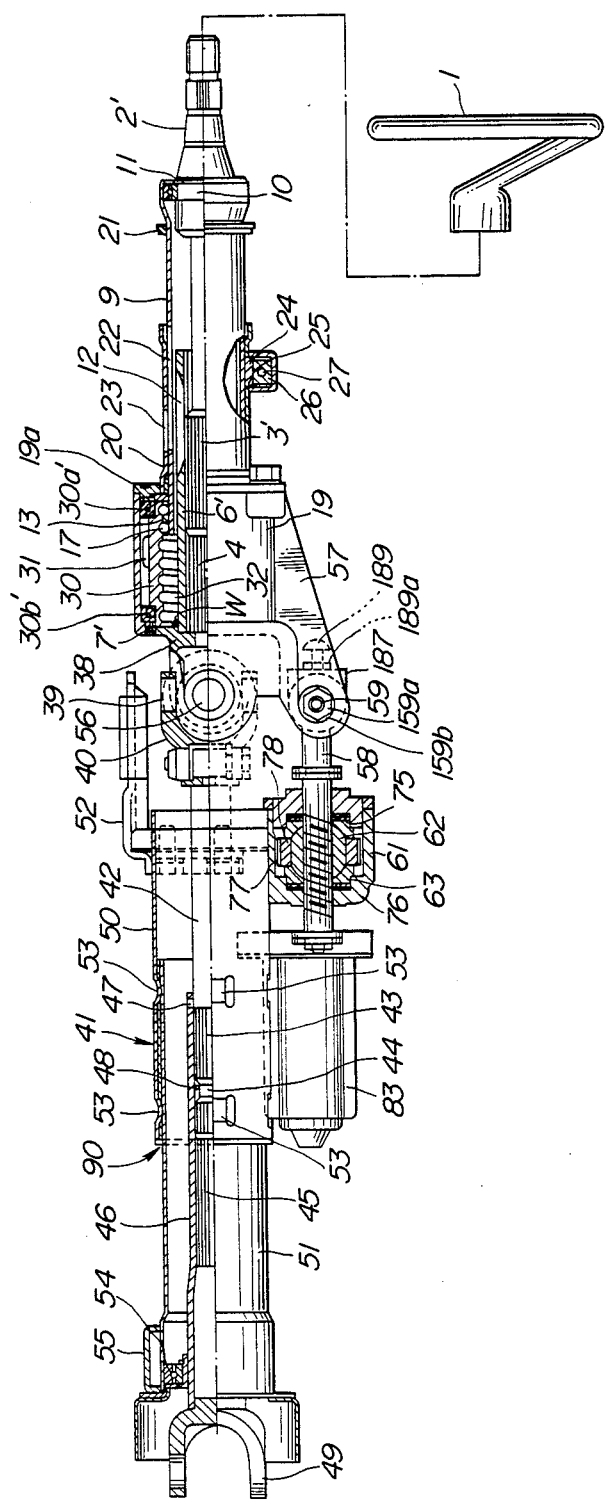
FIG. 10 is a side elevation, partly in section, of a third embodiment of the steering column arrangement in accordance with the present invention.
Figure 11:
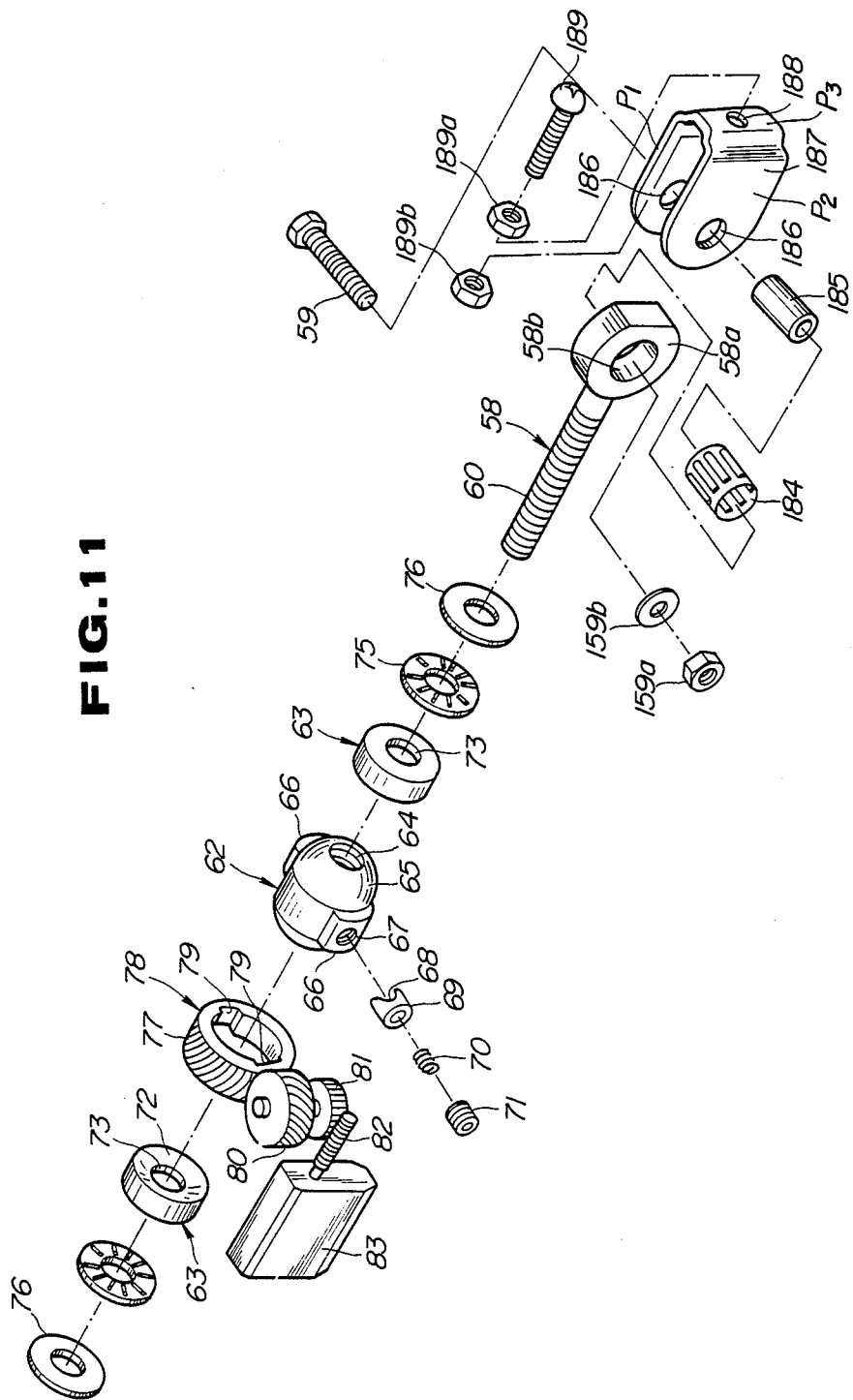
FIG. 11 is a perspective exploded view of an essential part of the tilt mechanism of the steering column arrangement of FIG. 10.
Figure 12:
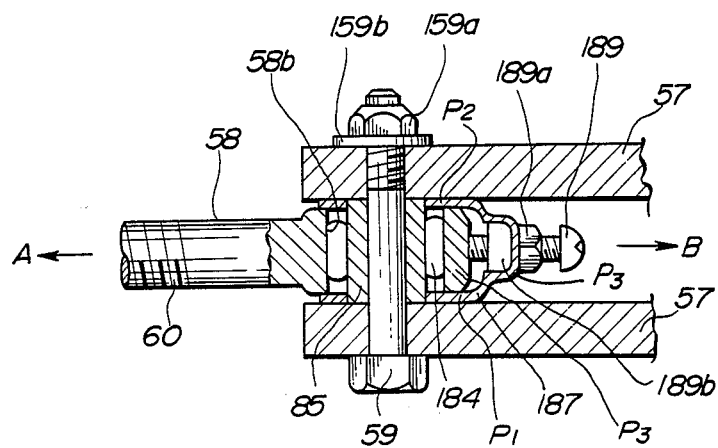
FIG. 12 is a cross-sectional view of a play omitting device of the tilt mechanism of the steering column arrangement of FIG. 10.

FIGS. 10 to 12 illustrate a third embodiment of the steering column arrangement according to the present invention, which is similar to the first embodiment except for a supporting device for the tilt screw 58 forming part of the tilt mechanism. In this embodiment, a cylindrical needle cage 184 is rotatably disposed in the cylindrical opening 58a of the tilt screw 58. In the needle cage 184, a plurality of needle rollers are retained in a parallel and rotatable relationship along the periphery of a cylindrical retainer (not shown). A cylindrical collar 185 is disposed inside the needle cage 184 and has opposite end sections which are fitted respectively in holes 186, 186 of a spacer 187 having a generally C-shaped cross-section. The holes 186, 186 are formed respectively in the two spaced plate sections P₁, P₂ of the spacer 187. The spacer 187 is fitted to the annular section 58a of the tilt screw 58 in such a manner that the annular section 58a is interposed between the two spaced plate sections P₁, P₂. The spacer 187 is made of elastic material and formed at its connecting plate section P₃ with a threaded hole 188. The two side plate sections P₁, P₂ of the spacer 187 are integrally connected through the connecting plate section P₃ with each other. A screw 189 is screwed in the threaded hole 188 and fixable in a desired position by two nuts 189a, 189b which are engagingly mounted on the screw 189 on the opposite sides of the connecting plate section P₃ of the spacer 187. The tip end of the screw 189 is brought into contact with the surface of the annular section 58a of the tilt screw 58.

The bolt 159 tightly pierces the cylindrical collar 185 and extends to project over the opposite ends of the collar 185. The opposite end sections of the bolt 159 pass through the two spaced arms 57, 57 and are fastened to them by using a nut 159a and a washer 159b. Thus the annular section 58a of the tilt screw 58 with the spacer 187 are securely interposed between the opposite arms 57, 57 of the movable bracket 19 as shown in FIG. 12.

As seen from FIG. 12, upon screwing the screw 189 in the axial direction of the tilt screw 58 or in the direction of an arrow A, the spacer 187 is biased in the counter tilt screw direction or in the direction of an arrow B. As a result, the collar 185 is pulled in the counter tilt screw direction and therefore the collar 185 is one-sided in the cylindrical hole 58b or biased in the direction of the arrow B, so that a clearance between the needle cage 184 and the surface of the hole 58b is one-sided in the direction of the arrow B. This substantially omits the clearance inside the cylindrical hole 58b of the tilt screw 58. In other words, upon biasing the spacer 187 in the axial direction of the tilt screw 58, the bolt 159 with the collar 185 is biased against one side of the inner peripheral surface of the cylindrical hole 58b or the needle cage 84.

Thus, no clearance is produced between the tilt screw 58 and the movable bracket 19, and therefore there is no fear of producing a so-called play therebetween. This effectively prevents the steering wheel from vibrating, thereby avoiding uncomfortable feeling due to vibration for vehicle passengers.

It will be understood that the spacer 187 may be biased in the opposite direction to the direction shown in FIG. 12, i.e., in the direction of the arrow A, in which a clearance between the collar 185 and the inner surface of the cylindrical hole 58b is one-sided in the direction of the arrow B while the collar 185 is biased in the direction of the arrow A within the cylindrical hole 58b. It is preferable that the whole tilt screw 58 be coated with a fluorine-containing resin except for the surface of the cylindrical hole 58b. This greatly reduces friction between the tilt screw 58 and the spherical member 62 thereby making possible to use a smaller electric motor 83.

Figure 13:
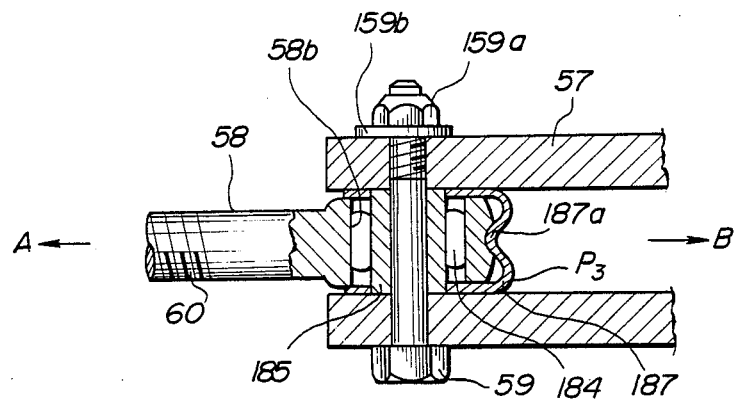
FIG. 13 is a cross-sectional view similar to FIG. 12 but showing another example of the play omitting device.

FIG. 13 shows another example of the supporting device for the tilt screw 58, which is similar to and may be used in place of that of FIG. 12. In this example, the connecting plate section P₃ of the spacer 187 is bent to the side of the annular section 58a of the tilt screw 58 to form a contacting portion 187a which is brought into contact, with the annular section 58a, thus functioning as same as the arrangement shown in FIG. 12.

Figure 14:
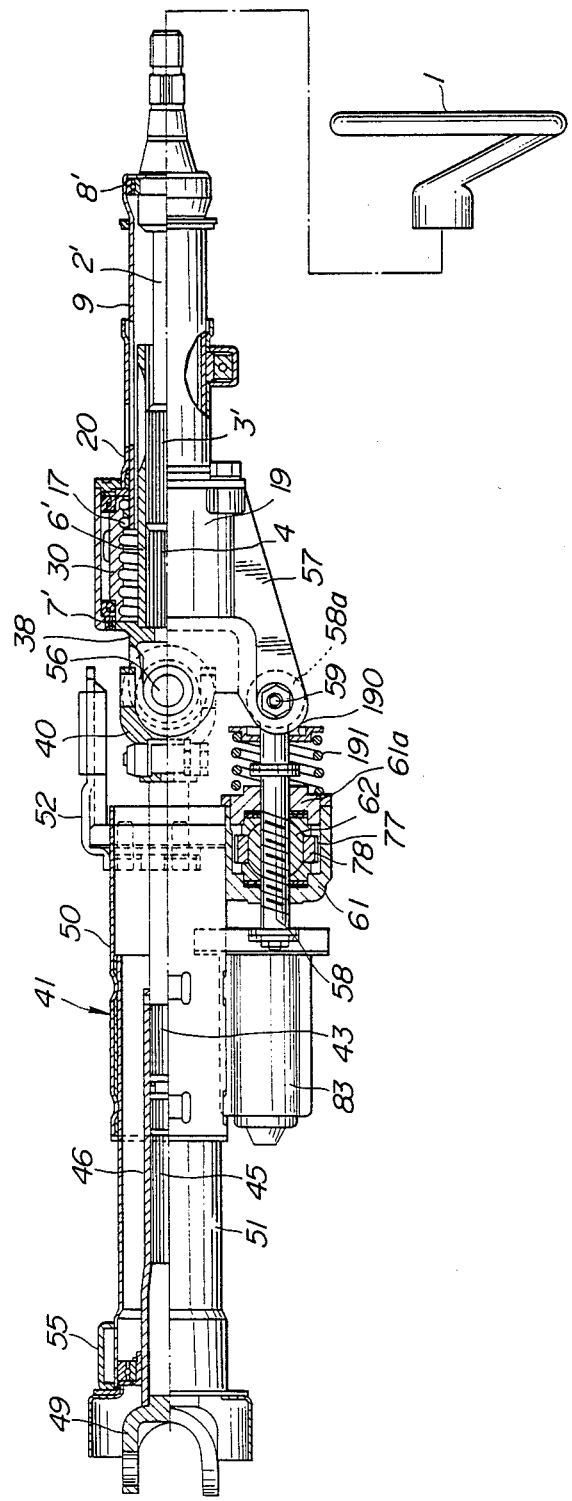
FIG. 14 is a side elevation, partly in section, of a fourth embodiment of the steering column arrangement in accordance with the present invention.

FIGS. 14 and 15 illustrate a fourth embodiment of the steering column arrangement according to the present invention, which is similar to the first embodiment of FIGS. 1 to 5 except for the structure of the tilt mechanism. In this embodiment, an annular spring seat 190 is mounted on the tilt screw 58 in such a manner that tilt screw 58 pierces the central opening of the spring seat 190. The spring seat 190 is brought into contact with the arms 57, 57 of the movable bracket 19. Additionally, a compression spring 191 is mounted around the tilt screw 58 and interposed between the housing 61 (a housing cap section 61a) and the spring seat 190. With this arrangement, when the movable bracket 19 is rotated upwardly, a part of load applied to the movable bracket 19 is allotted by the compression spring 191, thereby assisting the capability of the electric motor 83. When the movable bracket 19 is rotated downwardly, the compression spring 191 serves to suppress the downward force due to the weight of the movable bracket 19 itself. Thus, the above-arrangement assists the capability of the electric motor, thereby making possible to use a even smaller electric motor and minimizing the space required for the electric motor.

It will be understood that the compression spring 191 may be replaced with a tension spring or other spring mechanism for biasing the arms 57 or the movable bracket 19 upwardly or in the direction far from the housing 61.

What is claimed is:

1. A steering column arrangement for a vehicle, comprising a telescope traveling mechanism which includes:
   a steering shaft on which a steering wheel is fixedly mounted, said steering shaft being axially movable relative to a stationary member which is movable relative to a vehicle body;
   a plurality of balls movably fixed on an outer peripheral surface of said steering shaft and positioned along a helical line on the steering shaft peripheral surface;
   means for allowing each ball to rotate and disabling said ball from displacing;
   a sleeve disposed around said steering shaft and formed at its inner peripheral surface with a helical groove in which said balls are fitted, said sleeve being rotatable around its axis and axially fixed to a side of said stationary member;
   an annular gear coaxially formed on the outer peripheral surface of said sleeve;
   a drive gear in mesh with said annular gear; and
   means for driving said drive gear by an electric motor.

2. A steering column arrangement as claimed in claim 1, wherein said steering shaft includes a tube member, and said means for allowing and disabling includes a ring member coaxially mounted on said tube member at one end section and fixedly secured to said tube member.

3. A steering column arrangement at claimed in claim 2, wherein said ring member is formed at its outer peripheral surface with a plurality of holes which are positioned along the helical line on the ring member peripheral surface, each ball being rotatably fitted in each hole, said ring member including means for allowing at least a part of each ball to project outward of the outer peripheral surface of said ring member.

4. A steering column arrangement as claimed in claim 1, wherein said helical groove of said sleeve is generally semicylindrical in cross-section.

5. A steering column arrangement as claimed in claim 1, wherein said telescope traveling mechanism includes an inner ring coaxially and tightly mounted on said steering shaft, said inner ring member being axially slidably movable relative to said steering shaft and formed along its periphery with a first annular tapered surface; an outer ring member disposed generally coaxial with said inner ring member and fixed to said stationary member, said outer ring member being axially fixedly connected to an end section of said sleeve and formed at its inner periphery with a second annular tapered surface in contact with said first annular tapered surface of said inner ring member; and means for causing said inner ring member to be in press contact with said outer ring member.

6. A steering column arrangement as claimed in claim 5, wherein said at least one of said first and second annular tapered surfaces is eccentric relative to said steering shaft.

7. A steering column arrangement as claimed in claim 5, wherein said stationary member is a bracket having a cylindrical inner surface coaxial with said steering shaft.

8. A steering column arrangement as claimed in claim 7, wherein said telescope traveling mechanism includes first and second ball bearings which are located at the opposite end sections of said sleeve, said sleeve being rotatably supported through said first and second ball bearings on the inner surface of said bracket.

9. A steering column arrangement as claimed in claim 8, wherein said outer ring member is in contact with said first ball bearing and in contact with the cylindrical inner surface of said bracket, wherein said inner ring member is in contact with an inner surface of a side wall of said bracket.

10. A steering column arrangement as claimed in claim 5, wherein said telescope traveling mechanism includes a damping ring member made of elastomeric material and secured to said inner ring member so as to contact with the outer peripheral surface of said steering shaft.

11. A steering column arrangement as claimed in claim 7, wherein said outer ring is formed at its outer periphery with a projection fitted in a groove formed in said bracket.

12. A steering column arrangement as claimed in claim 1, further comprising a tilt mechanism including:
    a tilt hinge mechanism through which said stationary member is rotatably supported to a fixed member which is fixed relative to the vehicle body;
    a tilt screw connecting said stationary member and said fixed member, axial displacement of said tilt screw relative to said fixed member causing said stationary member to tilt;
    a nut structure engagingly mounted on said tilt screw and axially fixed relative to said fixed member, said nut structure being rotatable around its axis under drive of an electric motor, rotation of said nut structure causing said tilt screw to make its axial displacement;
    means defining a hole contiguous with an axial threaded opening of said nut structure, the tilt screw being disposed in said axial threaded opening;
    a seat member disposed in said hole and formed with a curved surface; and
    means for biasing said seat member in a direction of said tilt screw so that said seat member curved surface is brought into press contact with a peripheral surface of said tilt screw.

13. A steering column arrangement as claimed in claim 12, wherein said biasing means includes a coil spring disposed in said nut structure hole and in contact with said seat member.

14. A steering column arrangement as claimed in claim 12, wherein said hole of said nut structure is threaded on its peripheral surface.

15. A steering column arrangement as claimed in claim 14, wherein said biasing means includes a set screw screwed in the threaded hole of said nut structure to be brought into contact with said coil spring.

16. A steering column arrangement as claimed in claim 12, said tilt mechanism includes a ring gear fixedly and coaxially mounted on said nut structure, and means for drivably connecting said ring gear to said electric motor.

17. A steering column arrangment as claimed in claim 1, wherein said tilt screw has an end section defining a hole through which a bolt passes is secured to said stationary member.

18. A steering column arrangement as claimed in claim 17, wherein said tilt mechanism includes for omitting a play between said tilt screw and said bolt, said play omitting means including a collar disposed in said tilt screw hole and mounted on said bolt, and means for biasing said collar in an axial direction of said tilt screw.

19. A steering column arrangement as claimed in claim 18, wherein said biasing means includes a spacer disposed between said tilt screw end section and said stationary member to which said collar is fixed, and means for biasing said spacer in the axial direction of said tilt screw.

20. A steering column arrangement as claimed in claim 19, wherein said play omitting means includes a cylindrical needle cage disposed within said tilt screw hole and rotatably mounted on said collar.

21. A steering column arrangement as claimed in claim 19, wherein said stationary member has opposite and spaced first and second arms, wherein said spacer is generally C-shaped in cross-section and has opposite and spaced first and second plate sections, said first plate section being disposed between said first arm and said tilt screw, said second plate section being disposed between said second arm and said tilt screw, opposite end sections of said collar being fitted respectively to said first and second plate sections, a third plate section integrally connecting said first and second plate sections, and means incorporating with said third plate section to bias the end section of said tilt screw in a direction far from said third plate section.

22. A steering column arrangement as claimed in claim 21, wherein said incorporating means includes a screw screwed through said spacer third plate section and extending to be brought into contact with the end section of said tilt screw.

23. A steering column arrangement as claimed in claim 12, wherein said tilt mechanism includes means for biasing said stationary member relative to said fixed member.

24. A steering column arrangement as claimed in claim 23, wherein said biasing means includes a compression spring disposed between said fixed member and said stationary member.

25. A steering column arrangement as claimed in claim 24, wherein said biasing means includes a spring seat disposed between said compression spring and said stationary member.

26. A steering column arrangement as claimed in claim 25, wherein said compression spring and said spring seat are generally coaxially mounted on said tilt screw.

27. A steering column arrangement for a vehicle, comprising a tilt mechanism which includes:
  a steering shaft on which a steering wheel is fixedly mounted, said steering shaft being connected to a stationary member which is movable relative to a vehicle body;
  a tilt hinge mechanism through which said stationary member is rotatably supported to a fixed member which is fixed relative to the vehicle body;
  a tilt screw connecting said stationary member and said fixed member, axial displacement of said tilt screw relative to said fixed member causing said stationary member to tilt;
  a nut structure engagingly mounted on said tilt screw and axially fixed relative to said fixed member, said nut structure being rotatable around its axis under drive of an electric motor, rotation of said nut structure causing said tilt screw to make its axial displacement;
  means defining a hole contiguous with an axial threaded opening of said nut structure, the tilt screw being disposed in said axial threaded opening;
  a seat member disposed in said hole and formed with a curved surface; and
  means for biasing said seat member in direction of said tilt screw so that said seat member curved surface is brought into press contact with peripheral surface of said tilt screw.

* * * * *